United States Patent [19]

McNulty

[11] Patent Number: 5,090,501

[45] Date of Patent: Feb. 25, 1992

[54] ROTARY PUMP OR MOTOR APPARATUS

[76] Inventor: Norbert E. McNulty, 604 Rudyard La., Virginia Beach, Va. 23464

[21] Appl. No.: 580,956

[22] Filed: Sep. 11, 1990

[51] Int. Cl.$^5$ .............................................. B60K 8/00
[52] U.S. Cl. ............................... 180/305; 192/58 R; 418/227
[58] Field of Search ............... 180/305, 306, 307, 308, 180/242, 244, 367, 369, 370; 60/629; 188/265; 192/58 R, 61; 418/2, 227

[56] References Cited

U.S. PATENT DOCUMENTS

| | | | |
|---|---|---|---|
| 637,429 | 11/1899 | Theemling | 418/183 |
| 792,216 | 6/1905 | Jacoby | 418/175 X |
| 1,298,140 | 3/1919 | Workman | 418/166 X |
| 1,869,053 | 7/1932 | Dudley | 418/227 X |
| 2,679,300 | 5/1954 | Nubling | 180/305 |
| 2,766,737 | 10/1956 | Sprinzing | 123/239 X |
| 2,938,663 | 5/1960 | Luck | 418/166 X |
| 3,273,501 | 9/1966 | Tothero | 418/166 X |
| 3,302,741 | 2/1967 | Brazuk | 180/242 X |
| 3,330,215 | 7/1967 | Yamane | 418/227 |
| 3,369,461 | 2/1968 | De Biasi | 180/305 X |
| 3,781,146 | 12/1973 | Bates | 418/175 X |
| 3,810,721 | 5/1974 | Eyer | 418/3 X |

FOREIGN PATENT DOCUMENTS 630114  5/1936 Fed. Rep. of Germany ...... 418/227

Primary Examiner—Robert P. Olszewski
Assistant Examiner—Brian L. Johnson
Attorney, Agent, or Firm—Neal J. Mosely

[57] ABSTRACT

A rotary apparatus for use as a pump, motor, meter, or fluid brake is disclosed. A stationary base member has a circular fluid channel with a pair of spaced fluid inlet and outlet ports within the channel. A rotor having a hollow cylindrical body portion substantially surrounds the base member and encloses the channel and has one or more peg-like piston members extending inward from the inner periphery of the rotor. The pistons are received in the channel and separate the channel into one or more enclosed fluid chambers and sequentially pass over the inlet and outlet ports. A ring gear on the inner periphery of the rotor engages a smaller gear rotatably mounted on the base member which is connected to a disc-shaped divider for rotating the divider in timed relation with the rotor upon relative rotation. The divider rotates partially in the channel and is recessed on its side wall to receive and travel in coordinated movement with the pistons during travel in the channel. Fluid entering the channel through the inlet port occupies a chamber defined by the pistons and travels around the channel to exit the outlet port. The disc-shaped divider and piston cooperatively change the configuration of the inlet and outlet ports allowing fluid passage therethrough while maintaining constant separation between the incoming and outgoing fluid. Fluid entering the channel through the inlet port after passage of a piston will occupy a subsequent chamber defined by the piston just leaving the divider.

21 Claims, 6 Drawing Sheets

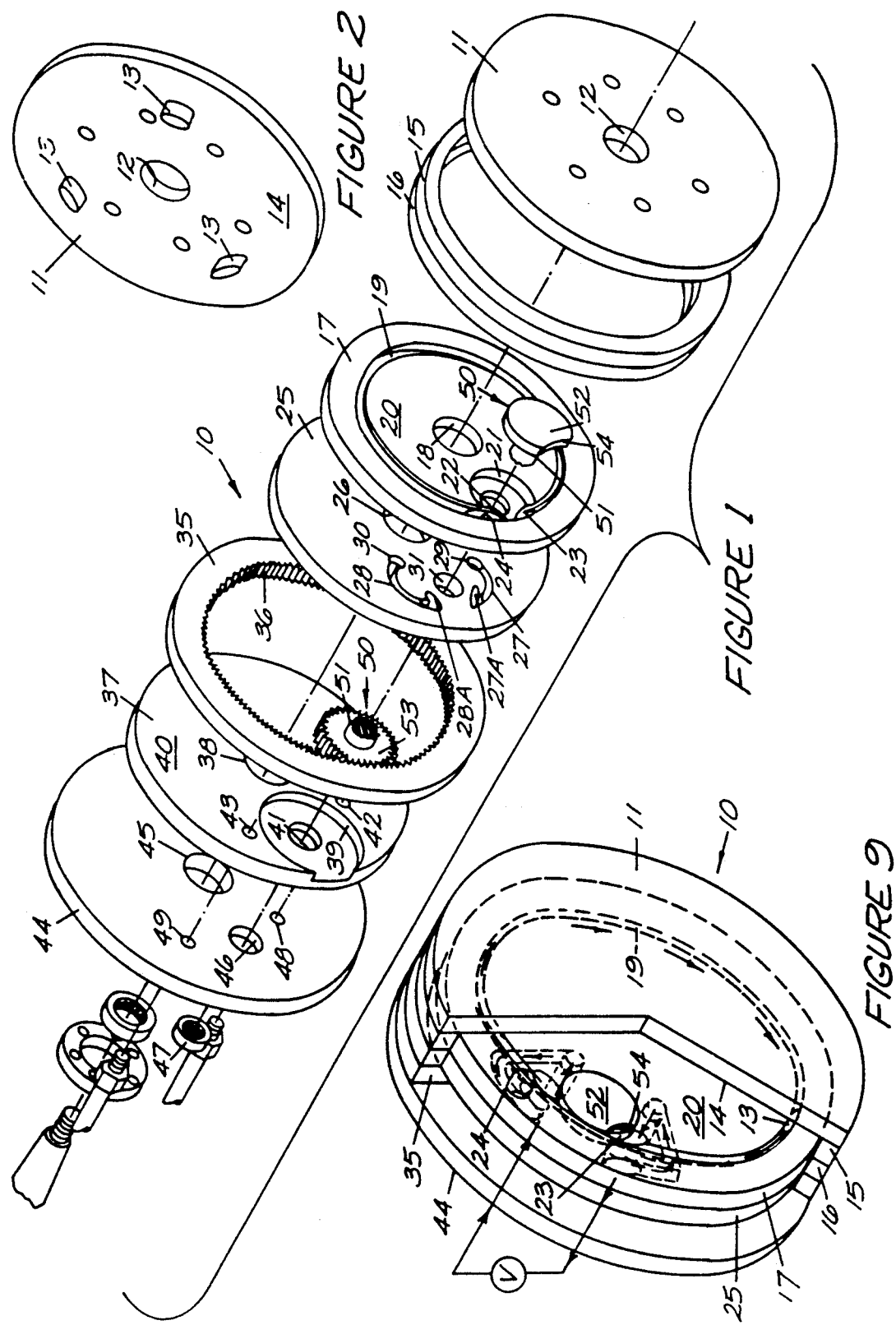

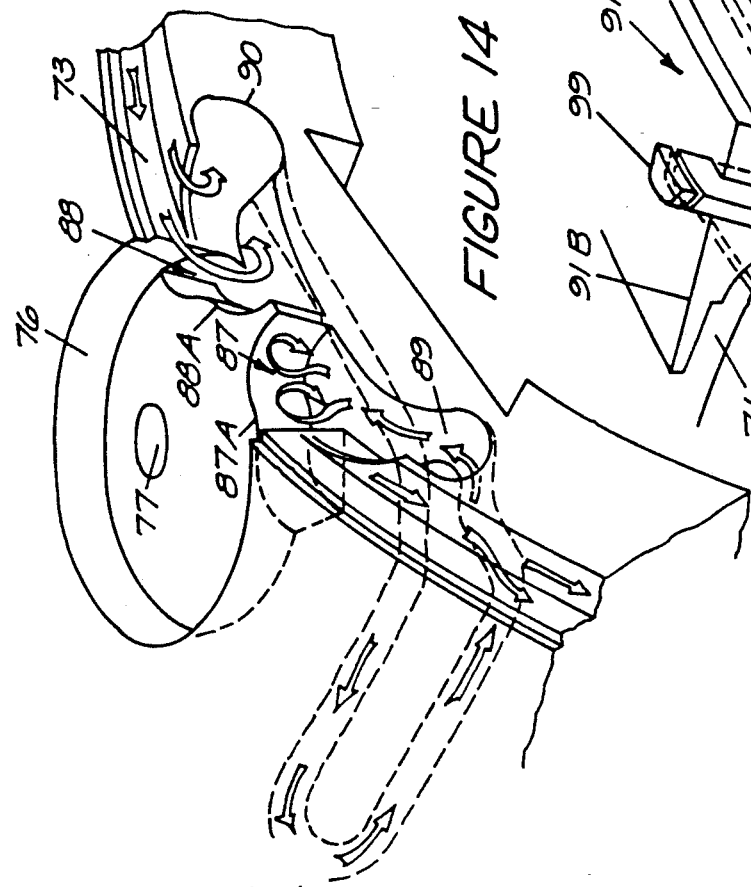
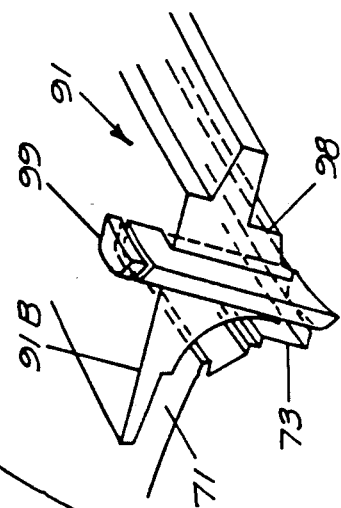
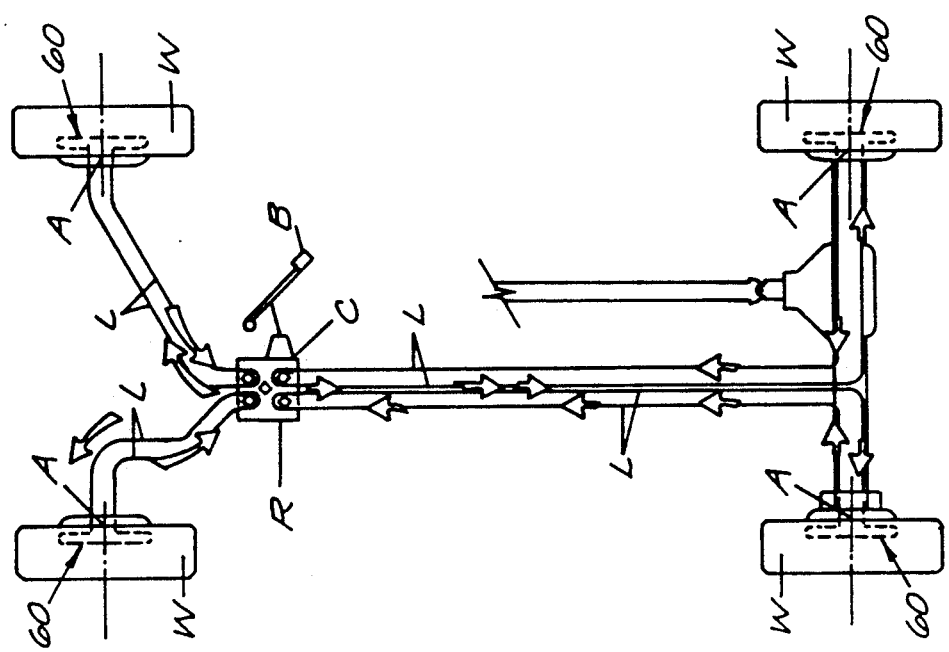

5,090,501

ROTARY PUMP OR MOTOR APPARATUS

BACKGROUND OF THE INVENTION

1. Field of the Invention

This invention relates generally to rotary pump and/or rotary motor apparatus, and more particularly to a rotary apparatus having a circular fluid channel with inlet and outlet ports within the channel and a rotor enclosing the channel which has one or more peg-like pistons received in the channel to define enclosed fluid chambers and which pass over the inlet and outlet ports in coordinated movement with a disc-shaped rotary divider to sequentially change the configuration of the inlet and outlet ports and provide constant separation between the incoming and outgoing fluid.

2. Brief Description of the Prior Art

There are several patents which disclose various rotary apparatus.

Bates, U.S. Pat. No. 3,781,146 discloses a readily reversible rotary apparatus combinable with an aircraft landing gear and other vehicles comprising a first mechanism selectively operable either as a compressor or as a prime mover and a second mechanism driven by the first for compressing air or a combustible mixture for controlled introduction into the expansion or combustion chambers of the first mechanism. The second mechanism may also be used as a prime mover powered by fluid pressure. The flow of compressed or expanding gases is controlled primarily by rotatable elements.

Theemling, U.S. Pat. No. 637,429 discloses a reversible rotary motor having a casing divided into two sections, each provided with an annular chamber and a plurality of oscillating abutments. A rotary disc-shaped piston located within the casing has laterally extending piston heads fitted to the chambers and arranged to operate the oscillating abutments.

Jacoby, U.S. Pat. No. 792,216 discloses a rotary engine with a cylinder having an annular steam space and a centrally disposed steam chest and a slotted rib dividing the two. An abutment guided within the slot has its inner edge exposed to the pressure of steam in the chest. A piston is carried by a shaft and a piston-wing in the steam space serves by contact with the abutment to force the latter from the steam space to the steam chest.

Tothero, U.S. Pat. No. 3,273,501 discloses a multiple cavity gear pump. Luck, U.S. Pat. No. 2,938,663 discloses a rotary compressors having a multiple lobe rotary piston.

Eyer, U.S. Pat. No. 3,810,721 discloses a rotary compressor having a rotary piston with a gear type construction.

Sprinzing, U.S. Pat. No. 2,766,737 discloses a rotary internal combustion engine having a valve which first delivers a small volume of air and then a full supply of air to the combustion chamber.

Workman, U.S. Pat. No. 1,298,140 discloses a rotary gas engine with a planetary gear arrangement and a rotary piston which is fitted rotatively in the periphery of a hollow disk member and communicating with the working chambers of the engine and coacting with pistons fixed on the inner surface of a rotary case member rotatively mounted on the hollow disk member.

The present invention is distinguished over the prior art in general, and these patents in particular by a rotary apparatus for use as a pump, motor, meter, or fluid brake which has a stationary cylindrical base member with a circular fluid channel with a pair of spaced fluid inlet and outlet ports within the channel. A rotor having a hollow cylindrical body portion substantially surrounds the base member and encloses the channel and has one or more peg-like piston members extending inward from the inner periphery of the rotor. The pistons are received in the channel and separate the channel into one or more enclosed fluid chambers and sequentially pass over the inlet and outlet ports. A ring gear on the inner periphery of the rotor is engaged with a smaller gear rotatably mounted on the base member which is connected to a disc-shaped divider for rotating the divider in timed relation with the rotor upon relative rotation. The divider rotates partially in the channel and is recessed on its side wall to receive and travel in coordinated movement with the pistons as they travel in the channel. Fluid entering the channel through the inlet port occupies a chamber defined by the pistons and travels around the channel to exit the outlet port. The disc-shaped divider and piston cooperatively change the configuration of the inlet and outlet ports allowing fluid passage therethrough while maintaining constant separation between the incoming and outgoing fluid. Fluid entering the channel through the inlet port after passage of a piston will occupy a subsequent chamber defined by the piston just leaving the divider.

SUMMARY OF THE INVENTION

It is therefore an object of the present invention to provide a rotary apparatus which is easily adapted for use as a pump, motor, meter, or fluid brake.

It is another object of this invention to provide a rotary apparatus which will impart or impede rotary motion without a complex system of mechanical linkages.

Another object of this invention is to provide a rotary apparatus having a circular fluid channel on a stationary member with inlet and outlet ports within the channel and a rotor which substantially surrounds the stationary member to enclose the channel and which carries pistons received in the channel to define rotating enclosed fluid chambers.

A further object of this invention is to provide a rotary apparatus having a circular fluid channel on a stationary member with inlet and outlet ports within the channel and a rotor which substantially surrounds the stationary member to enclose the channel and which carries pistons received in the channel to define rotating enclosed fluid chambers and which pass over the inlet and outlet ports whereby fluid entering the channel through the inlet port occupies a chamber defined by the pistons and travels around the channel to exit the outlet port without impeding fluid flow.

A still further object of this invention is to provide a rotary apparatus having a circular fluid flow channel and a disc-shaped divider partially disposed in the channel which rotates in timed relation with a surrounding rotor and cooperates with a series of piston projections on the rotor to sequentially change the configuration of fluid inlet and outlet ports and provide constant separation between the incoming and outgoing fluid.

Other objects of the invention will become apparent from time to time throughout the specification and claims as hereinafter related.

The above noted objects and other objects of the invention are accomplished by a rotary apparatus having a stationary cylindrical base member with a circular fluid channel and a pair of spaced fluid inlet and outlet ports within the channel. A rotor having a hollow cylindrical body portion substantially surrounds the base member and encloses the channel and has one or more peg-like piston members extending inward from the inner periphery of the rotor. The pistons are received in the channel and separate the channel into one or more enclosed fluid chambers and sequentially pass over the inlet and outlet ports. A ring gear on the inner periphery of the rotor is engaged with a smaller gear rotatably mounted on the base member which is connected to a disc-shaped divider for rotating the divider in timed relation with the rotor upon relative rotation. The divider rotates partially in the channel and is recessed on its side wall to receive and travel in coordinated movement with the pistons as they travel in the channel. Fluid entering the channel through the inlet port occupies a chamber defined by the pistons and travels around the channel to exit the outlet port. The disc-shaped divider and piston cooperatively change the configuration of the inlet and outlet ports allowing fluid passage therethrough while maintaining constant separation between the incoming and outgoing fluid. Fluid entering the channel through the inlet port after passage of a piston will occupy a subsequent chamber defined by the piston just leaving the divider.

BRIEF DESCRIPTION OF THE DRAWINGS

FIG. 1 is an exploded isometric of a rotary pump or motor apparatus in accordance with the present invention.

FIG. 2 is an isometric view of the back side of the piston plate member of the rotary pump or motor of FIG. 1.

FIG. 9 is an isometric illustration of the rotary pump or motor of FIG. 1, showing schematically the fluid flow path.

FIG. 10 is a schematic plan view of a vehicle utilizing another embodiment of the rotary pump or motor as a wheel brake mechanism.

FIG. 14 is an partial schematic illustration of the rotary pump or motor of FIG. 11, showing the fluid flow path.

FIG. 15 is a partial illustration of the piston peg arrangement of the rotary pump or motor of FIG. 11.

DESCRIPTION OF A PREFERRED EMBODIMENT

Figure 3:
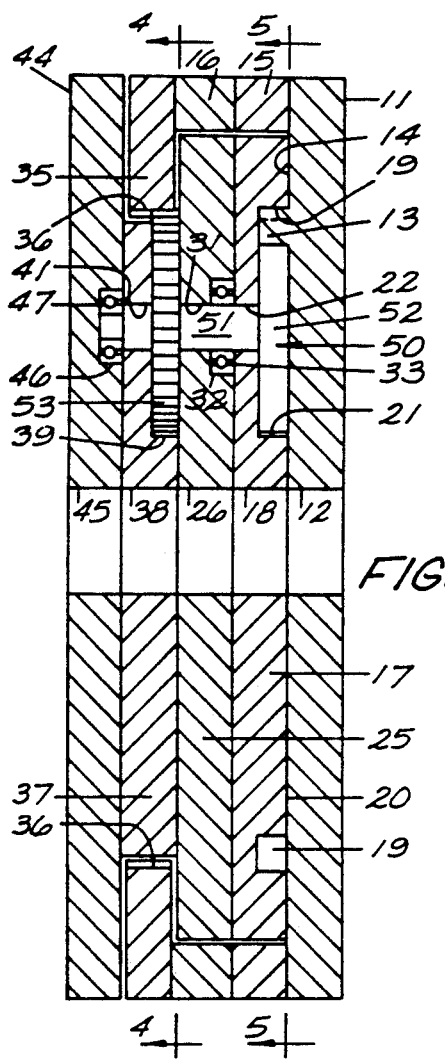
FIG. 3 is a cross section through the assembled rotary pump or motor of FIG. 1.
Figure 4:
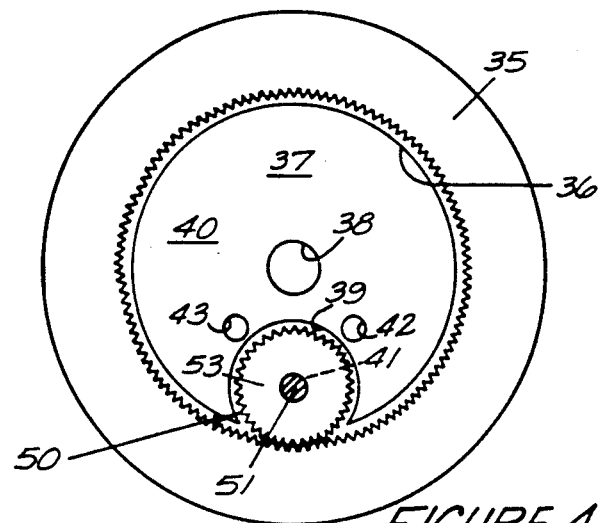
FIG. 4 is an elevation of the ring gear and carrier plate of the rotary pump or motor taken along line 4—4 of FIG. 3.

The rotary pump or motor apparatus of the present invention comprises a series of plate members assembled together and includes a rotary element which functions as a rotary piston which is moved as a planet element (or gear) of a planetary gear assembly. The apparatus may be used as a rotary pump or as a rotary motor by using pressurized fluid to rotate the piston and produce rotary motion. In another preferred embodiment, the rotary apparatus may be used as a rotary brake for vehicles wherein the braking action is accomplished by shutting off or restricting fluid flow from the apparatus.

Referring to FIGS. 1-9, there is shown a simplified embodiment of a rotary pump or motor apparatus 10. The rotary pump or motor 10 comprises a circular piston plate 11 having a central bore 12 and one or more circumferentially spaced piston peg members 13 projecting outwardly from its inner face 14. As best seen in FIG. 2, the piston pegs 13 are of a semi-cylindrical configuration and are positioned radially inward from the circumference of the piston plate 11.

A pair of circular flat spacer plates or rings 15 and 16 having a large interior diameter and an exterior diameter approximately the same as the piston plate 11 are secured to the piston plate 11. The spacer rings 15 and 16 serve as sleeves to form a central chamber and the piston plate 11 forms one end wall of the chamber.

A channel plate 17 is received adjacent the piston plate 11 within the chamber formed by the spacer rings 15 and 16. A central bore 18 extends through the channel plate 17. A circular groove or channel 19 is formed in the outer face 20 of the channel plate 17 radially inward from the circumference of the plate 17. The channel 19 is generally U-shaped in cross section and has an inner wall and outer wall. A circular recess 21 is formed in the outer face 20 and its outer diameter cuts slightly into the outer wall of the channel 19, such that the channel is segmented by the recess 21. A bore 22 extends through the center of the recess 21.

Figure 8:
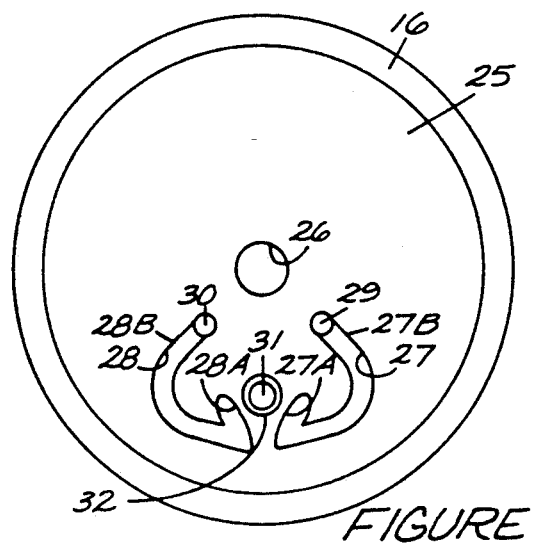
FIG. 8 is an elevation of the port plate of the rotary pump or motor.
Figures 6, 7:
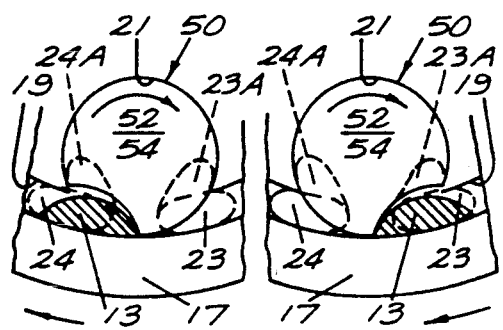
FIGS. 6 and 7 are partial elevations of the channel plate showing the path of a piston member traveling in the channel.

A pair of fluid ports 23 and 24 extend through the channel plate 17. The fluid ports 23 and 24 are disposed, in spaced apart relation, partially in the recess 21 in the path of the channel 19 just inward of the point at which the channel is cut by the recess 21. In transverse cross section, each port 23 and 24 is in the shape of a pair of ovals joined at one end and their other ends 23A and 24A diverging such that one oval portion 23,24 lies in the plane of the channel 19 and the other oval portion 23A,24A is tangent with the side wall of the recess 21 (FIGS. 6, 7, and 8).

Figure 5:
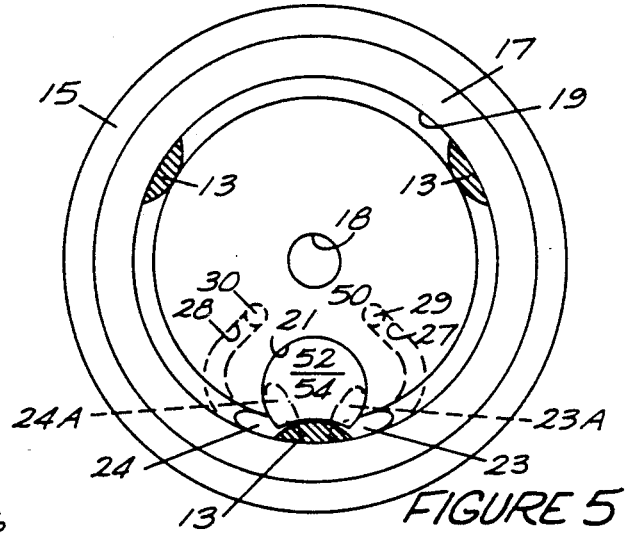
FIG. 5 is an elevation of the channel plate of the rotary pump or motor taken along line 5—5 of FIG. 3.

A port plate 25 is received adjacent the channel plate 17 within the chamber formed by the spacer rings 15 and 16. A central bore 26 extends through the port plate 25 in axial alignment with the bores 12 and 18 in the piston plate 11 and channel plate 17, respectively. As best seen in FIG. 8, a pair of opposed, generally J-shaped grooves or channels 27 and 28 are formed in the outer face of the port plate 25 radially inward from the circumference of the plate 25. Each J-shaped channel is U-shaped in cross section and has an inner wall and outer wall. The outer portion of each J-shaped channel 27 and 28 lies in a plane parallel to the channel 19 in the channel plate 17 and the inwardly facing ends 27A and 28A of the J-shaped channels are axially aligned with the oval fluid ports 23 and 24 of the channel plate 17 (FIG. 5).

The opposed ends of the J-shaped channels 27 and 28 are each cut in the same configuration as the fluid ports 23 and 24 but they do not extend through the port plate 25. In other words, each opposed end is in the shape of a pair of ovals joined at one end and their other ends diverging such that one oval lies in the bottom curved plane of the J-shaped channel 19 and the other oval 27A and 28A diverges outwardly coaxial with the ends of the ports 23 and 24 to form an extension thereof. The elongate leg 27B and 28B of each J-shaped channel extends radially toward the center of the port plate 25 and terminates in bores 29 and 30 which extend through the port plate 25. A bore 31 extends through the port plate 25 in axial alignment with the bore 22 in the channel plate 17 and may be counterbored 32 to receive a bearing 33 (FIG. 3).

A ring gear 35 having gear teeth 36 in its interior diameter is received adjacent the port plate 25. The exterior diameter of the ring gear 35 is approximately the same as the exterior diameter of the spacer rings 15 and 16.

A carrier plate 37 having an exterior diameter smaller than the interior diameter of the teeth 36 of the ring gear 35 is received concentrically within the ring gear 35 to allow for relative rotation. The carrier plate 37 has a central bore 38 extending therethrough in axial alignment with the bores 12, 18, and 26 in the piston plate 11, channel plate 17, and the port plate 25, respectively. A circular recess 39 is formed in the outer face 40 of the carrier plate 37 and is approximately tangent to the interior diameter of the ring gear 35. A bore 41 extends through the center of the recess 39 in axial alignment with the bore 31 of the channel plate 25. A pair of ports 42 and 43 extend through the carrier plate 37 in axial alignment with the bores 29 and 30 of the port plate 25.

A base plate 44 is received adjacent the ring gear 35 and the carrier plate 37. The exterior diameter of the base plate 44 is approximately the same as the exterior diameter of the ring gear 35 and the spacer rings 15 and 16. A central bore 45 extends through the base plate 44 in axial alignment with the bores 12, 18, 26, and 38 in the piston plate 11, channel plate 17, port plate 25, and the carrier plate 37, respectively. A counterbore 46 (FIG. 3) in the base plate 44 in axial alignment with the bore 41 of the carrier plate 37 receives a bearing 47. A pair of ports 48 and 49 extend through the base plate 44 in axial alignment with the bores 42 and 43 of the carrier plate 37. The base plate 44 serves as the mounting block for the device. The bores 48 and 49 may be threaded to receive hose connectors for connecting the apparatus to a closed loop fluid system.

The carrier plate 37 is secured to the base plate 44 and, as a unit, the carrier plate 37 and base plate 44 make up the other end wall of the chamber formed by the spacer rings 15 and 16.

A rotary divider member 50 is rotatably mounted within the chamber. The rotary divider member 50 comprises an axle or shaft 51 which has a disc member 52 secured at one end and a timing gear member 53 secured near the opposite end. The disc member 52 is rotatably received in the recess 21 of the channel plate 17 and the shaft 51 extends through the bore 22 of the channel plate 17, the bore 31 of the port plate 25, through the timing gear 53, and into the counterbore 46 of the base plate 44. The shaft 51 may have a reduced diameter portion which is journalled within the bearing 47 mounted in the counterbore 46. The disc member 52 has an arcuate recess 54 in its side wall.

When all the plates are assembled together, the piston pegs 13 of the piston plate 11 are received in the channel 19 of the channel plate 17 and the inner face of the piston plate 11 forms the top wall of the channel 19. The piston pegs 13 divide the channel 19 into separate chambers for receiving fluid. The inner face of the channel plate 17 forms the top wall of the elongate legs 27B and 28B of the J-shaped channels 27 and 28 and ports 29 and 30 in the port plate 25, leaving a passageway between the oval recesses 27A and 28A and the ports 23 and 24 in the channel plate 17.

As seen in FIG. 9, a fluid flow path is established which runs around through the channel 19, through the oval fluid ports 23 and 24 in the channel plate 17, the oval recesses 27A and 28A in the port plate 25, through the J-shaped channels 27 and 28 toward the center of the port plate, and through the aligned ports 29-30, 42-43, and 48-49, of the port plate 25, carrier plate 37, and base plate 44, respectively. Hoses are connected to the ports 48 and 49 of the base plate 44.

The base plate 44, carrier plate 37, port plate 25, and channel plate 17, are stationary. The piston plate 11, spacer rings 15 and 16, and the ring gear 35 all rotate as a unit (rotor) relative to the stationary plates for input or offtake of power. During rotation, the piston pegs 13 of the piston plate 11 are moved through the channel 19 in the channel plate 17, while the ring gear 35 causes the timing gear 53 to rotate which causes simultaneous rotation of the disc member 52 (FIGS. 5, 6, and 7). The gearing of the ring gear 35 and timing gear 53 is such that as each piston peg 13 comes around through the channel 19, the arcuate recess 54 of the disc 52 will receive each piston peg 13 and move with it in coordinate movement as the piston peg passes through the disc 52. In other words, as the ring gear 35 makes one revolution, the disc 52 will make three revolutions.

The fluid flow path can best be described with reference to FIGS. 5-9. The fluid is pushed around the channel 19 by the piston pegs 13. The recess 54 in the disc 52 moves around as the disc rotates and is only in the channel 19 for an instant to allow the piston peg 13 to pass through. As each piston peg 13 passes through the arcuate recess 54 of the disc 52, the disc outer periphery moves over the channel 19 while allowing only the piston peg to pass through the recess 54. As the leading edge of the piston peg 13 approaches the disc 52, it glides over the oval portion of the port 23 in the channel 19 and the recess 54 of disc 52 rotates into the channel and in doing so, rotates over the diverging oval portion 23A of the port 23 which lies beneath it. Thus, the outlet fluid passageway is maintained open for the fluid moving before and after the piston peg 13 which passes over the portion of the port 23 in the channel.

Thus, the passage of the piston pegs 13 are synchronized to pass through the recess 54 in the disc 52 such that a continual separation is maintained between the incoming and outgoing fluid and the fluid is forced down through the port 23 or 24 depending upon the direction of rotation of the piston plate 11. In other words, the channel 19 carrying the fluid is separated into two sides, and if rotation is clockwise, the fluid will enter the channel through the port 24, around the channel 19 and down exit through the port 23.

The port 23 is axially aligned with the oval portion 27A of the port 27 in the port plate 25 and the fluid will be transmitted through the leg of port 27 and exit through the bore 29. The bore 29 is axially aligned with the bore 42 in carrier plate 37 and bore 48 in the base plate 44 and the fluid will exit through the bore 48. The bores 48 and 49 may be connected to inlet and outlet hoses and a valve mechanism V installed therebetween to form a closed loop fluid system. The fluid is forced into the loop and the fluid flow may be regulated by the valve mechanism V which may be remote from the rotary apparatus. The fluid will enter through the bore 49 in the base plate 44 and the bore 43 in carrier plate 37 and into the bore 30 of the port 28. It then will travel through the leg of port 28 and through the oval portion 28A where it then enters the channel 19. The fluid entering the channel 19 is then pushed around the channel by peg 13 just leaving the disc 52.

It should be understood from the forgoing description of the rotary apparatus that when pressurized fluid is introduced through the inlet port it will apply torque to rotate the rotor for using the apparatus as a fluid driven motor. If torque is applied to the rotor to rotate it, the rotation will cause the piston pegs to draw fluid through the inlet port and discharge it through the outlet port for using the apparatus as a fluid pump.

It should also be understood, that the rotor may have indicia I on its circumference, or connected with other conventional indicator means for indicating the volume of fluid discharged through the outlet port whereby the apparatus can be used for a meter device.

ANOTHER EMBODIMENT

Referring now to FIG. 10-15, there is shown a rotary pump or motor similar to that previously described which may be used, for example, as a brake mechanism for wheeled vehicles with the vehicle brake pedal serving as the remote valve mechanism. As shown schematically in FIG. 10, a rotary brake mechanism 60 is installed on the wheel axle A of each wheel W. There is an inlet and outlet hydraulic line L connected between each rotary brake mechanism 60 and the brake master cylinder C. When the vehicle is moving, the rotating members connected to the wheel rotate and push fluid around their channels (described hereinafter) and the fluid flows in a closed loop through the rotary brake mechanisms 60, hydraulic lines L, and fluid reservoir R. Depressing the brake pedal B actuates a valve mechanism V (see FIG. 9) to shut off fluid flow through the closed loop hydraulic system.

Referring to FIGS. 11-15, there is shown a wheel axle A rotatably mounted within a stationary tubular member T which is secured to a stationary hub member 61. A pair of laterally spaced fluid ports 62 and 63 extend through the hub member 61 and are connected to the fluid reservoir R by hydraulic lines L. The outer ends of the tubular member T and axle A extend outwardly from the hub member 61 and the axle A has the usual flange F with lug bolts L1 secured thereto.

Figure 11:
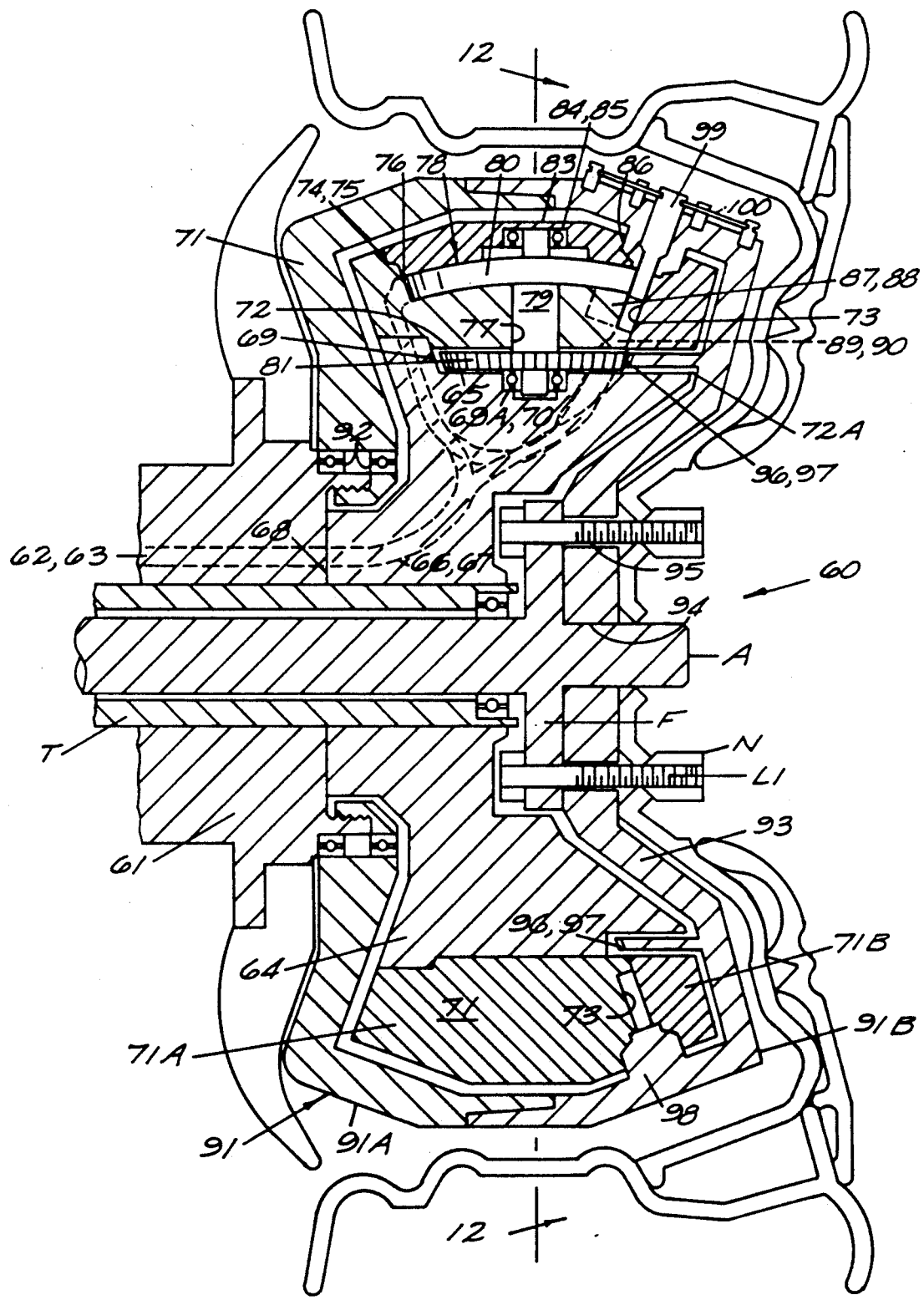
FIG. 11 is a cross section through the assembled rotary pump or motor of FIG. 10.
Figure 13:
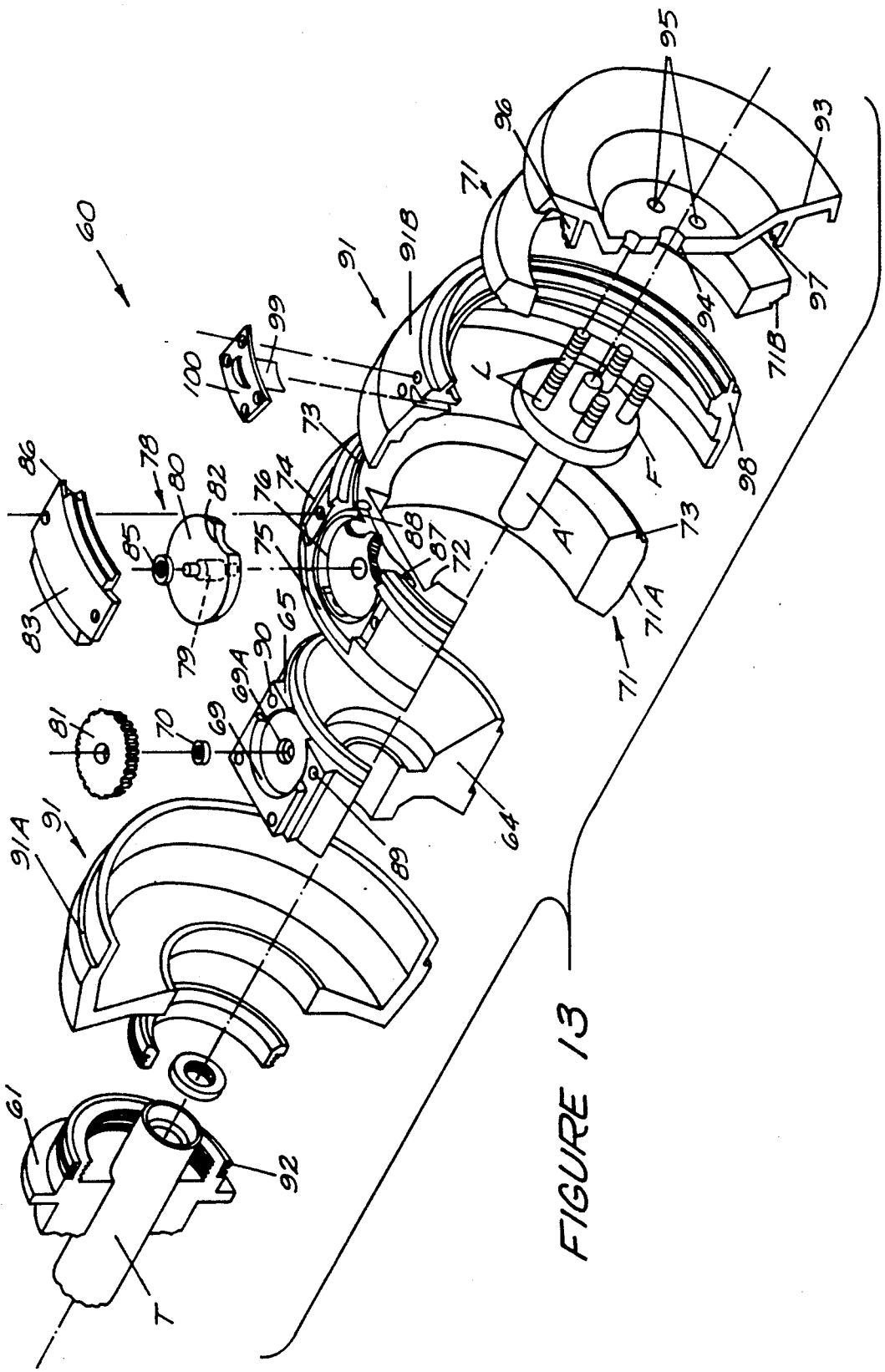
FIG. 13 is an exploded isometric of the rotary pump or motor apparatus of FIG. 11.

An intermediate port ring 64 is secured on the outer end of the tubular member T. The circumference of port ring 64 has a raised flat portion 65 (FIGS. 11, 13). A pair of fluid ports 66 and 67 extend through the port ring 64 from its inward face 68 and up to the raised flat portion 65. The inward ends of ports 66 and 67 are axially aligned with ports 62 and 63 of hub 61. A circular recess 69 in the raised flat portion 65 and a small bore 69A in the recess receives a bearing 70.

A channel ring 71 is secured concentrically to the port ring 64 and surrounds the circumference of the port ring 64. For assembly purposes, the channel ring 71 may be formed of two mating rings 71A and 71B (FIGS. 11 and 13). The interior diameter of the channel ring 71 has a transverse slot 72 which receives the raised flat portion 65 of the port ring 64 and defines a circular cavity between the interior diameter of the channel ring 71 and the raised flat portion 65 of the port ring 64 (FIG. 11). A circumferential groove or channel 73 is formed on the circumference of the channel ring 71A. The channel 73 is generally U-shaped in cross section and has an inner wall and outer wall. The outer wall of the channel 73 may be formed by the mating ring 71B. The channel ring 71 has an open segment 74 at one point on its circumference. The open segment 74 has an arcuate rectangular opening 75, a circular counterbore 76, and a bore 77 which extends radially through the channel ring 71. The counterbore 76 has a convex bottom surface.

A rotary divider member 78 is rotatably mounted in the channel ring 71 within the open segment 74. The rotary divider member 78 comprises a shaft 79 with a convex disc member 80 secured at one end and a timing gear 81 secured near the opposite end. The disc member 80 is rotatably received in the counterbore 76 of the channel ring 71 and the shaft 79 extends through the bore 77 of the channel ring. The timing gear 81 is secured to the shaft 79 and resides in the annular space 72 between the reduced diameter portion 65 of the port ring 64 and the interior diameter of the channel ring 71 (FIG. 11). The shaft 79 has a reduced diameter portion which is journalled within the bearing 70 mounted in the bore 69. The disc member 80 has an arcuate recess 82 in its side wall.

An arcuate plate 83 is secured within the rectangular opening 75 of the channel ring 71 and has a bore 84 which receives a bearing 85. The upper end of the shaft 79 is journalled in the bearing 85. The longitudinal side edge of the arcuate plate 83 has a groove or channel 86 which forms a continuation of the channel 73 of the channel ring 71 when the plate is assembled therein. Thus, the channel 73 and channel continuation 86 extends radially above and below the convex bottomed counterbore 76 which contains the disc member 80.

A pair of fluid ports 87 and 88 extend through the channel ring 71. The upper ends of the fluid ports 87 and 88 are disposed, in spaced apart relation, partially in the counterbore 76 in the path of the channel 73 and channel continuation 86 just inward of the point at which the channel is cut by the counterbore 76. As best seen in FIG. 14, the top portion of each port B7 and Bs, in transverse cross section, is in the shape of a pair of ovals joined at one end and their other ends 87A and 88A diverging such that one oval portion 87,88 lies in the plane of the channel 73 and channel continuation 86 and the other oval portion 87A,88A is tangent with the side wall of the counterbore 76. The oval portions are recessed and do not extend through the channel ring, but are joined to the ports 66 and 67 of the port ring 64 by laterally spaced passageways 89 and 90 extending therebetween.

A hollow cylindrical outer housing 91 surrounds the port ring 71 and channel ring 64. The outer housing 91 is formed of an inward 91A and outward 91B segment which are secured together over the rings 71 and 64. The inward segment 91A is journalled by bearings 92 to the stationary hub member 61. The outer wall 93 of the outward segment 91B has a central hole 94 and a plurality of smaller holes 95 surrounding the central hole 94. The outward segment 91B is received on the outer end of the axle A with the lugs L extending through the holes 95 and is secured to the axle A by lug nuts N. Thus, the outer housing 91 rotates with the wheel axle A about the circumference of the channel ring 71.

A circular ring 96 extends from the interior of the outer wall 93 of the outward segment 91B and is received in the annular space 72 between the reduced diameter portion 65 of the port ring 64 and the interior diameter of the channel ring 71. The ring 96 has gear teeth 97 on its edge which engage the teeth of the timing gear 81. The outward segment 91B has a generally V-shaped ring portion 98 extending angularly inwardly from the interior of its circumferential wall which is received partially within the channel 73 and channel extension 86 and forms the top wall thereof.

One or more circumferentially spaced piston peg members 99 (FIGS. 11 and 15) are installed through the circumferential wall of the outward segment 91B of the housing 91 and project angularly inward through the V-shaped ring portion 98 of segmeant 91B and into the channel 73 and channel extension 86 of the channel ring 71. Three piston pegs 99 are shown in the illustrated embodiment of FIG. 12. The piston pegs 99 are connected to an arcuate plate or bracket 100 which is secured to the circumference of the outward segment 91B. The piston pegs 99 are semioval in transverse cross section.

When all the members are assembled together, the V-shaped ring portion 98 of segment 91B is received in the outer portion of the channel 73,86 and the piston pegs 99 connected to the outer housing 91 are received in the channel 73 and channel continuation 86 of the channel ring 71. The piston pegs 99 divide the channel into separate chambers for receiving fluid.

A fluid flow path is established which runs around through the channel 73 and channel continuation 86, through the oval fluid ports 87 and 88, passageways 89 and 90 in the channel ring 71, the aligned passageways 66 and 67 in the port ring 64, and passageways 62 and 63 in the stationary hub 61. Hydraulic lines are connected to the ports 62 and 63 of the hub 61.

The hub 61, port ring 64, and channel ring 71, are stationary and the outer housing 91 rotates with the wheel W relative to the stationary members. In this mode of operation the apparatus is working as a pump circulating brake fluid with the power input being from the rotation of the wheel W. During rotation, the piston pegs 99 are moved through the channel 73 and continuation 86 in the channel ring 71, while the toothed ring 96 on the outer housing 91 causes the timing gear 81 to rotate which causes simultaneous rotation of the disc member 80. The gear ratio of the ring 96 and timing gear 81 is such that as each piston peg 99 comes around through the channel 73, the arcuate recess 82 of the disc 80 will receive each piston peg and move with it in coordinated movement as the piston peg passes through the disc 80. In other words, as the outer housing makes one revolution, the disc will make three revolutions.

Figure 12:
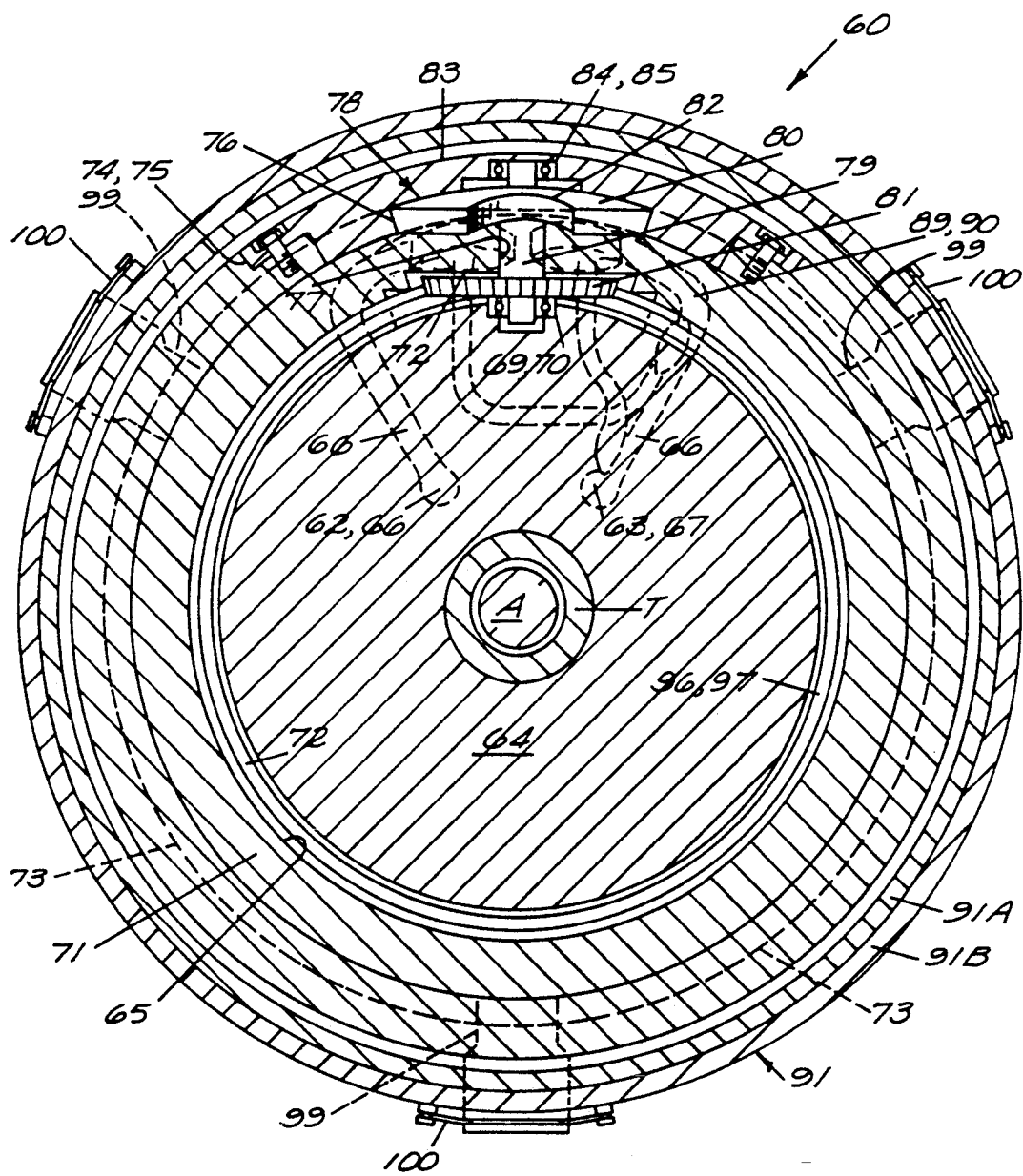
FIG. 12 is a cross section through the assembled rotary pump or motor of FIG. 11 taken along line 12—12.

The fluid flow path can best be described with reference to FIGS. 11, 12, and 14. The fluid is pushed around the channel 73 by the piston pegs 99. The recess 82 in the disc 80 moves around as the disc rotates and is only in the channel 73 for an instant to allow the piston peg 99 to pass through. As each piston peg 99 passes through the arcuate recess 82 of the disc 80, the outer periphery of the disc moves over the channel 73 while allowing only the piston peg to pass through the recess. As the leading edge of the piston 99 approaches the disc 80, it glides over the oval portion of the port 87 in the channel and the recess 82 of disc 80 rotates into the channel and in doing so, rotates over the diverging oval portion 87A of the port 87 which lies beneath it. Thus, the outlet fluid passageway is maintained open for the fluid moving before and after the piston peg 99 which passes over the port 87 in the channel.

Thus, the passage of the piston pegs 99 are synchronized to pass through the recess 82 in the disc 80 such that a continual separation is maintained between the incoming and outgoing fluid and the fluid is forced down through the port 87 or 88 depending upon the direction of rotation of the outer housing 91. In other words, the channel 73 carrying the fluid is separated into two sides, and if rotation is counterclockwise, the fluid will enter the channel through the port 87, around the channel 73 and exit through the port 88.

The fluid will be transmitted through the passageway 89 of the channel ring 71, passageway 66 of the port ring 64, and passageway 62 of the hub 61. The bores 62 and 63 of the hub 61 are connected to hydraulic lines which are connected to the master cylinder of the vehicle to form a closed loop fluid system. The fluid is forced into the loop and the fluid flow may be controlled by the brake pedal. The fluid will enter through the bore 63 in the hub 61 and passageways 67 and 87 in the port ring 64 and channel ring 71, respectively, and into the oval port portion 89 where it will then enter the channel 73. The fluid entering the channel 73 is then pushed around the channel by the piston peg 99 just leaving the disc 80. The operation of the brake pedal progressively closes the brake valve to restrict flow of brake fluid and thus gradually restrict rotation of the rotor (and wheel attached thereto) until it completely stops.

This apparatus has been described in the mode of operation of a fluid pump. If it is operated in reverse, it functions as a motor. Replacement of the brake cylinder with a pump circulating the fluid to the units on the wheels provides application of power directly to two or more of the wheels individually.

While this invention has been described fully and completely with special emphasis upon a preferred embodiment, it should be understood that within the scope of the appended claims the invention may be practiced otherwise than as specifically described herein.

I claim:

1. A rotary apparatus for use as one of a pump, motor, meter, and fluid brake, the apparatus comprising;
   a stationary base member having a circular recessed channel portion defining a fluid chamber with a fluid inlet port and a fluid outlet port disposed in spaced apart relation within said channel,
   a rotor having a hollow body portion rotatably received on and substantially surrounding said base member and enclosing said channel and having at least one piston portion extending adjacent to an inward from an inner periphery of the body portion,
   said piston portions projecting into said channel to divide said channel into a plurality of enclosed fluid chambers configured to sequentially pass over said base member fluid inlet and outlet ports,
   rotary divider means disposed partially within said base member channel and configured to receive and travel in coordinated movement with said piston portions to move over said base member fluid inlet and outlet ports after passage of a said piston portion,
   timing means connected between said rotor and said rotary divider means for rotating said divider means in predetermined timed relation with said rotor, whereby
   fluid entering said channel through said inlet port will fill a chamber defined by said piston portions and travel around said channel to exit from said outlet port, said piston portions are timed to travel with said rotary divider means in coordinated movement such that said rotary divider means when moving over said inlet and outlet ports will sequentially allow fluid passage therethrough while cooperatively maintaining constant separation between incoming and outgoing fluid, and fluid entering said channel through said inlet port after passage of a piston portion will fill a subsequent chamber defined by said piston portion just leaving said rotary divider means to travel around said channel and exit said outlet port, said apparatus functioning as one of a pump, meter and brake when power is supplied to said rotor and fluid is circulated thereby, and functioning as a motor when fluid is circulated therethrough by external power and power is taken off at said rotor.

2. A rotary apparatus according to claim 1 wherein pressurized fluid is introduced through said inlet port to apply torque to rotate said rotor for using said apparatus as a fluid driven motor.

3. A rotary apparatus according to claim 1 wherein torque is applied to said rotor to rotate same and upon rotation said piston portions draw fluid through said inlet port and discharge fluid through said outlet port for using said apparatus as a fluid pump.

4. A rotary apparatus according to claim 1 wherein pressurized fluid is introduced through said inlet port to apply torque to rotate said rotor, and including indicator means operatively connected with said rotor for indicating the volume of fluid discharged through said outlet port, whereby the apparatus is used for a meter device.

5. A rotary apparatus according to claim 1 wherein torque is applied to said rotor to rotate same and upon rotation said piston portions draw fluid through said inlet port and discharge fluid through said outlet port, and including indicator means operatively connected with said rotor for indicating the volume of fluid discharged through said outlet port, whereby the apparatus is used for a meter device.

6. A rotary apparatus according to claim 1 including valve means operatively connected between said inlet and outlet port for shutting off fluid flow therebetween, whereby fluid flow through said channel is stopped upon shutting off fluid flow between said inlet and outlet ports to prevent rotation of said rotor and trap fluid within said enclosed fluid chambers for using said apparatus as a fluid brake.

7. A rotary apparatus according to claim 1 in which said timing means comprises outer gear means on the inner periphery of said rotor body portion, and inner gear means rotatably mounted on said base member and engaged with said outer gear means and operatively connected with said rotary divider means for rotating said rotary divider means in predetermined timed relation with said rotor upon relative rotation.

8. A rotary apparatus according to claim 1 in which said base member has a circular recess spaced adjacent to said channel such that an outer diameter extends into said channel and segments said channel, said rotary divider means comprises a disc-shaped member rotatably disposed within said recess and having a recessed portion in a side wall configured to receive said piston portions, such that upon synchronized rotation of said rotor and said rotary divider means said disc-shaped member recessed side wall portion will receive a said piston portion travelling through said channel and move in said channel in coordinated movement to allow said piston portion to complete a path through said channel.

9. A rotary apparatus according to claim 8 in which said base member inlet and outlet ports each in transverse cross section being generally in the shape of a pair of ovals joined at one end and at opposite ends diverging such that one oval portion lies in the plane of said channel and the other oval portion is tangent with the side wall of said base member recess, whereby rotation of said disc-shaped member will move over the oval portions of said inlet and outlet ports which are tangent with the side wall of said base member recess while allowing fluid flow through the oval portions of said ports which are in the plane of said channel when said piston portions move in said channel in coordinated movement, and said piston portions each in transverse cross section being generally arcuate to sequentially change a configuration of the fluid flow opening through the oval portions of said inlet and outlet ports which are in the plane of said channel when said piston portions move with said disc-shaped member in coordinated movement, whereby as said piston portions move with said disc-shaped member in coordinated movement, fluid is allowed to enter said chamber defined by said piston portions through said inlet port oval portion in said channel and fluid is allowed to exit from an adjacent chamber separated by respective piston portions through said outlet port oval portion in said channel.

10. A rotary apparatus according to claim 9 including a pair of fluid port extensions in said base member extending in spaced apart relation from the oval portions of said inlet and outlet ports which are in the plane of said channel to one side of said base member and adapted at extended ends for connection to a fluid supply.

11. A rotary apparatus according to claim 9 in which said rotor is formed of a series of circular plate members joined together to form a hollow cylindrical housing having an inside diameter and an outside diameter and an end wall enclosing one end, and said piston portions extend inward from said end wall.

12. A rotary apparatus according to claim 11 in which said base member has a flat circular end surface disposed adjacent said rotor end wall, and said circular channel portion is formed in said flat circular end surface.

13. A rotary apparatus according to claim 9 in which said rotor is formed of a plurality of circular plate members joined together to form a hollow cylindrical housing having an inside diameter and an outside diameter and an end wall enclosing one end, and said piston portions extend radially inward from said inside diameter.

14. A rotary apparatus according to claim 13 in which
said circular channel portion is formed on the circumference of said generally cylindrical base member.

15. The combination with a motor vehicle having a body frame with axles and wheels rotatably supported thereon and a rotary apparatus according to claim 6 in which
said stationary base member is supported on said frame in a fixed position,
said rotor is supported on a wheel in a fixed position,
a reservoir and fluid lines connected to said inlet and outlet ports define a closed system filled with fluid which is pumped continuously by rotation of said rotor, and
said valve means is connected to control fluid flow through said fluid lines and includes a brake pedal, whereby
fluid flow through said channel is stopped by operation of said brake pedal to shut off fluid flow through said fluid lines to prevent rotation of said rotor and said wheel to brake the motion of said vehicle.

16. A motor vehicle/rotary apparatus combination according to claim 15 in which
said timing means comprises outer gear means on the inner periphery of said rotor body portion, and
inner gear means rotatably mounted on said base member and engaged with said outer gear means and operatively connected with said rotary divider means for rotating said rotary divider means in predetermined timed relation with said rotor upon relative rotation.

17. A motor vehicle/rotary apparatus combination according to claim 15 in which
said base member has a circular recess spaced adjacent to said channel such that an outer diameter extends into said channel and segments said channel,
said rotary divider means comprises a disc-shaped member rotatably disposed within said recess and having a recessed portion in a side wall configured to receive said piston portions, such that
upon synchronized rotation of said rotor and said rotary divider means said disc-shaped member recessed side wall portion will receive a piston portion travelling through said channel and move in said channel in coordinated movement to allow said piston portion to complete a path through said channel.

18. A motor vehicle/rotary apparatus combination according to claim 17 in which
said base member inlet and outlet ports each in transverse cross section being generally in the shape of a pair of ovals joined at one end and at opposite ends diverging such that one oval portion lies in the plane of said channel and the other oval portion is tangent with the side wall of said base member recess, whereby
rotation of said disc-shaped member will move over the oval portions of said inlet and outlet ports which are tangent with the side wall of said base member recess while allowing fluid flow through the oval portions of said ports which are in the plane of said channel when said piston portions move in said channel in coordinated movement, and
said piston portions each in transverse cross section being generally arcuate to sequentially change a configuration of the fluid flow opening through the oval portions of said inlet and outlet ports which are in the plane of said channel when said piston portions move with said disc-shaped member in coordinated movement, whereby
as said piston portions move with said disc-shaped member in coordinated movement, fluid is allowed to enter said chamber defined by said piston portions through said inlet port oval portion in said channel and fluid is allowed to exit from an adjacent chamber separated by respective piston portions through said outlet port oval portion in said channel.

19. A motor vehicle/rotary apparatus combination according to claim 18 in which
a pair of fluid port extensions in said base member extending in spaced apart relation from the oval portions of said inlet and outlet ports which are in the plane of said channel to one side of said base member and adapted at their extended ends for connection to a fluid supply.

20. A motor vehicle/rotary apparatus combination according to claim 15 in which
said rotor is formed of a plurality of circular plate members joined together to form a hollow cylindrical housing having an inside diameter and an outside diameter and an end wall enclosing one end, and
said piston portions extend radially inward from said inside diameter.

21. A motor vehicle/rotary apparatus combination according to claim 15 in which
said circular channel portion is formed on the circumference of said generally cylindrical base member.

* * * * *